US009001001B2

(12) United States Patent
Nakano et al.

(10) Patent No.: US 9,001,001 B2
(45) Date of Patent: Apr. 7, 2015

(54) COMMUNICATION TERMINAL APPARATUS AND ANTENNA DEVICE

(71) Applicant: Murata Manufacturing Co., Ltd., Nagaokakyo-shi, Kyoto-fu (JP)

(72) Inventors: Shinichi Nakano, Nagaokakyo (JP); Noboru Kato, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 206 days.

(21) Appl. No.: 13/716,558

(22) Filed: Dec. 17, 2012

(65) Prior Publication Data

US 2013/0127573 A1    May 23, 2013

Related U.S. Application Data

(63) Continuation of application No. PCT/JP2011/063631, filed on Jun. 15, 2011.

(30) Foreign Application Priority Data

Jun. 18, 2010 (JP) ................................. 2010-138879

(51) Int. Cl.
*H01Q 7/00* (2006.01)
*H01F 38/14* (2006.01)
*G06K 7/10* (2006.01)
(Continued)

(52) U.S. Cl.
CPC ............ *H01F 38/14* (2013.01); *G06K 7/10009* (2013.01); *H01Q 1/2225* (2013.01); *H01Q 7/00* (2013.01); *H01Q 19/00* (2013.01)

(58) Field of Classification Search
CPC ........... H01Q 7/00; H01Q 1/38; H01Q 1/243; H01Q 7/005; G06K 19/07749
USPC .................. 343/866, 741–745, 895; 235/492
See application file for complete search history.

(56) References Cited

U.S. PATENT DOCUMENTS 5,337,063 A * 8/1994 Takahira ........................ 343/741
5,903,239 A * 5/1999 Takahashi et al. ...... 343/700 MS
(Continued)

FOREIGN PATENT DOCUMENTS

| CN | 2263405 Y | 9/1997 |
| CN | 1282940 A | 2/2001 |

(Continued)

OTHER PUBLICATIONS

Official Communication issued in International Patent Application No. PCT/JP2011/063631, mailed on Sep. 20, 2011.
(Continued)

*Primary Examiner* — Huedung Mancuso
(74) *Attorney, Agent, or Firm* — Keating & Bennett, LLP

(57) ABSTRACT

An antenna device which includes a coil conductor and a booster conductor. The coil conductor is defined by wound loop-shaped conductors and includes a first opening at a winding center and two ends connected to a feeding circuit. The booster conductor includes a coupling conductor portion and a frame-shaped radiation conductor portion. The coupling conductor portion includes a second opening overlapped at least partially by the first opening, is split in a portion thereof by a slit, and is electromagnetically coupled to the coil conductor. The frame-shaped radiation conductor portion includes a third opening and is connected to the coupling conductor portion.

10 Claims, 9 Drawing Sheets

(51) Int. Cl.
*H01Q 1/22* (2006.01)
*H01Q 19/00* (2006.01)

(56) References Cited

U.S. PATENT DOCUMENTS

| | | | |
|---|---|---|---|
| 6,107,920 A * | 8/2000 | Eberhardt et al. | 340/572.7 |
| 6,452,563 B1 * | 9/2002 | Porte | 343/866 |
| 2004/0124983 A1 | 7/2004 | Kuroda et al. | |
| 2006/0267138 A1 * | 11/2006 | Kobayashi | 257/531 |
| 2008/0143625 A1 | 6/2008 | Mizushima et al. | |
| 2009/0201116 A1 | 8/2009 | Orihara | |
| 2009/0266900 A1 * | 10/2009 | Ikemoto et al. | 235/492 |
| 2010/0308118 A1 | 12/2010 | Kataya et al. | |
| 2011/0031320 A1 | 2/2011 | Kato et al. | |
| 2011/0181486 A1 | 7/2011 | Kato | |
| 2012/0091821 A1 | 4/2012 | Kato et al. | |

FOREIGN PATENT DOCUMENTS

| | | |
|---|---|---|
| CN | 101207234 A | 6/2008 |
| EP | 0 948 083 A2 | 10/1999 |
| JP | 2001-351083 A | 12/2001 |
| JP | 2002-222396 A | 8/2002 |
| JP | 2003-218624 A | 7/2003 |
| JP | 2003-331250 A | 11/2003 |
| JP | 2007-188382 A | 7/2007 |
| JP | 2007-324865 A | 12/2007 |
| JP | 2009-182630 A | 8/2009 |
| JP | 2011-249938 A | 12/2011 |
| WO | 89/07347 A1 | 8/1989 |
| WO | 2007/138770 A1 | 12/2007 |
| WO | 2009/128437 A1 | 10/2009 |
| WO | 2009/142114 A1 | 11/2009 |
| WO | 2010/047214 A1 | 4/2010 |
| WO | 2010/122685 A1 | 10/2010 |
| WO | 2010/122888 A1 | 10/2010 |

OTHER PUBLICATIONS

Official Communication issued in corresponding UK Patent Application No. GB 1221951.5, mailed on May 28, 2014.

* cited by examiner

■ EXAMPLE OF PRESENT INVENTION
◆ COMPARATIVE EXAMPLE

COMMUNICATION TERMINAL APPARATUS AND ANTENNA DEVICE

BACKGROUND OF THE INVENTION

1. Field of the Invention

The present invention relates to communication terminal apparatuses and antenna devices. In particular, the present invention relates to communication terminal apparatuses and antenna devices that can be used in a radio frequency identification (RFID) system.

2. Description of the Related Art

In recent years, an RFID system has been used as an article information management system. In an RFID system, predetermined information is transmitted between a reader/writer that generates an induction field and an RFID tag attached to an article, through non-contact communication based on an electromagnetic field. An RFID tag stores predetermined information and includes a wireless IC (feeding circuit) that processes a predetermined wireless signal and an antenna device that performs transmission/reception of a high-frequency signal. Further, various portable terminal apparatuses that include an antenna device for an RFID system have been recently developed as near field communication (NFC) apparatuses.

Japanese Unexamined Patent Application Publication No. 2001-351083 discloses a non-contact data carrier apparatus that includes a non-contact data carrier, provided with an antenna coil, and an auxiliary antenna for the data carrier. The auxiliary antenna includes a conductive sheet that is arranged outside of a position that is the same as or substantially the same as the innermost circumference of an antenna coil. The area of one side of the conductive sheet is greater than or equal to the area surrounded by the antenna coil. The auxiliary antenna is arranged near the antenna coil of the data carrier. However, in this non-contact data carrier apparatus, the conductive sheet, which functions as a radiation plate, is solid and occupies a large space. Thus, other electronic components need to be mounted in a region other than the region of the conductive sheet, which results in low space efficiency and an increase in the size of the portable terminal apparatus.

Japanese Unexamined Patent Application Publication No. 2007-324865 discloses an antenna circuit that includes an antenna conductor in which a predetermined conductor pattern is provided on the top surface of a base member and a metal surface is arranged on the bottom surface of the base member, where a portion of the metal surface is provided with a cut-out portion that has a shape in which both a starting end and a terminating end of the cut-out portion are open ends in areas in which the metal surface does not exist. However, to obtain necessary communication characteristics, the metal surface and the antenna conductor must be increased in size, leading to an increase in the overall size of the antenna, which is also due to the thickness of the base member. Thus, other electronic components need to be mounted in a region other than the regions of the metal surface and antenna conductor, resulting in low space efficiency and an increase in the size of the portable terminal apparatus.

International Publication No. 2009/142114 discloses a wireless IC device that includes a wireless IC chip which processes a predetermined wireless signal, a feeding circuit substrate which is connected to the wireless IC chip and which includes a feeding circuit including at least one coil pattern, and a radiation plate which radiates a transmission signal supplied from the feeding circuit substrate and which receives a reception signal and supplies the reception signal to the feeding circuit substrate. Further, FIG. 18 of International Publication No. 2009/142114, for example, illustrates a radiation plate defined by a first electrode including an opening and a slit and a radiation plate defined by a second ring electrode that surrounds the first electrode. However, since the second ring electrode completely surrounds the first electrode, the Q factor is likely to be low and there is room to improve the communication characteristics. Further, in International Publication No. 2009/142114, there is no mention of improving space efficiency in relation to other electronic components.

SUMMARY OF THE INVENTION

To overcome the problems described above, preferred embodiments of the present invention provide a communication terminal apparatus and an antenna device having improved communication characteristics and in which other electronic devices can be arranged with high space efficiency.

A communication terminal apparatus according to a first preferred embodiment of the present invention preferably includes an antenna device and an electronic apparatus that has a function different from a function of the antenna device and that outputs information to the outside or receives information from the outside. The antenna device preferably includes a coil conductor including a loop-shaped wound conductor that includes a first opening at a winding center, and two ends which are connected to a feeding circuit, and a booster conductor including includes a coupling conductor portion that includes a second opening that is at least partially overlapped by the first opening, is split in a portion thereof by a slit, and is electromagnetically coupled to the coil conductor, and a frame-shaped radiation conductor portion that includes a third opening and is connected to the coupling conductor portion. The electronic apparatus is preferably arranged so as to output information to the outside or receive information from the outside through the third opening.

An antenna device according to a second preferred embodiment of the present invention preferably includes a coil conductor including a loop-shaped wound conductor that includes a first opening at a winding center, and two ends which are connected to a feeding circuit, and a booster conductor including a coupling conductor portion that includes a second opening that is at least partially overlapped by the first opening, is split in a portion thereof by a slit, and is electromagnetically coupled to the coil conductor, and a frame-shaped radiation conductor portion that includes a third opening and is connected to the coupling conductor portion.

In the antenna device described above, an induced current is generated in the coil conductor through feeding of electricity from a feeding circuit. This induced current causes an induced current to be further generated in the frame-shaped radiation conductor portion through the coupling conductor portion, and a magnetic field is generated from the frame-shaped radiation conductor portion, whereby communication with the reader/writer of an RFID system is performed. Since the booster conductor is at least partially overlapped by the coil conductor in the coupling conductor portion, an induced current is efficiently generated and communication characteristics are improved. In particular, since the radiation conductor portion of the booster conductor has a frame shape, the Q factor of the coil conductor is significantly increased, and the communication characteristics are significantly improved.

Since the radiation conductor portion of the booster conductor has a frame shape (third opening), information can be input/output through the third opening. For example, it is possible to take a photograph through the third opening by arranging a camera in the third opening, infrared communication with the outside is possible through the third opening by arranging an infrared communication apparatus in the third opening, and audio messages, for example, can be transmitted to the outside through the third opening by arranging a loud speaker in the third opening. In this manner, by arranging an electronic apparatus in the third opening to output information to the outside or receive information from the outside, high-density component mounting in a portable terminal apparatus is achieved.

According to various preferred embodiments of the present invention, communication characteristics are significantly improved and other electronic apparatuses can be arranged with high space efficiency.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 2A is a diagram explaining a current flowing through a coil conductor, FIG. 2B is a diagram illustrating currents flowing through a booster electrode, and FIG. 2C is a magnified sectional view taken along line C-C of FIG. 2A.

FIG. 9A is a plan view of a state in which a coil conductor and a booster conductor are combined and FIG. 9B is a plan view illustrating a state in which they are taken apart.

FIG. 10A is a plan view of a state in which a coil conductor and a booster conductor are combined and FIG. 10B is a plan view illustrating a state in which they are taken apart.

FIG. 11A is a plan view of a state in which a coil conductor and a booster conductor are combined and FIG. 11B is a plan view illustrating a state in which they are taken apart.

DETAILED DESCRIPTION OF THE PREFERRED EMBODIMENTS

Hereinafter, preferred embodiments of a communication terminal apparatus and an antenna device according to the present invention will be described with reference to the attached drawings. Note that common components and portions in the figures are denoted by the same reference symbols, and duplicate descriptions thereof are omitted. Further, a communication terminal apparatus is described as an example a portable terminal apparatus.

First Preferred Embodiment

Figure 1:
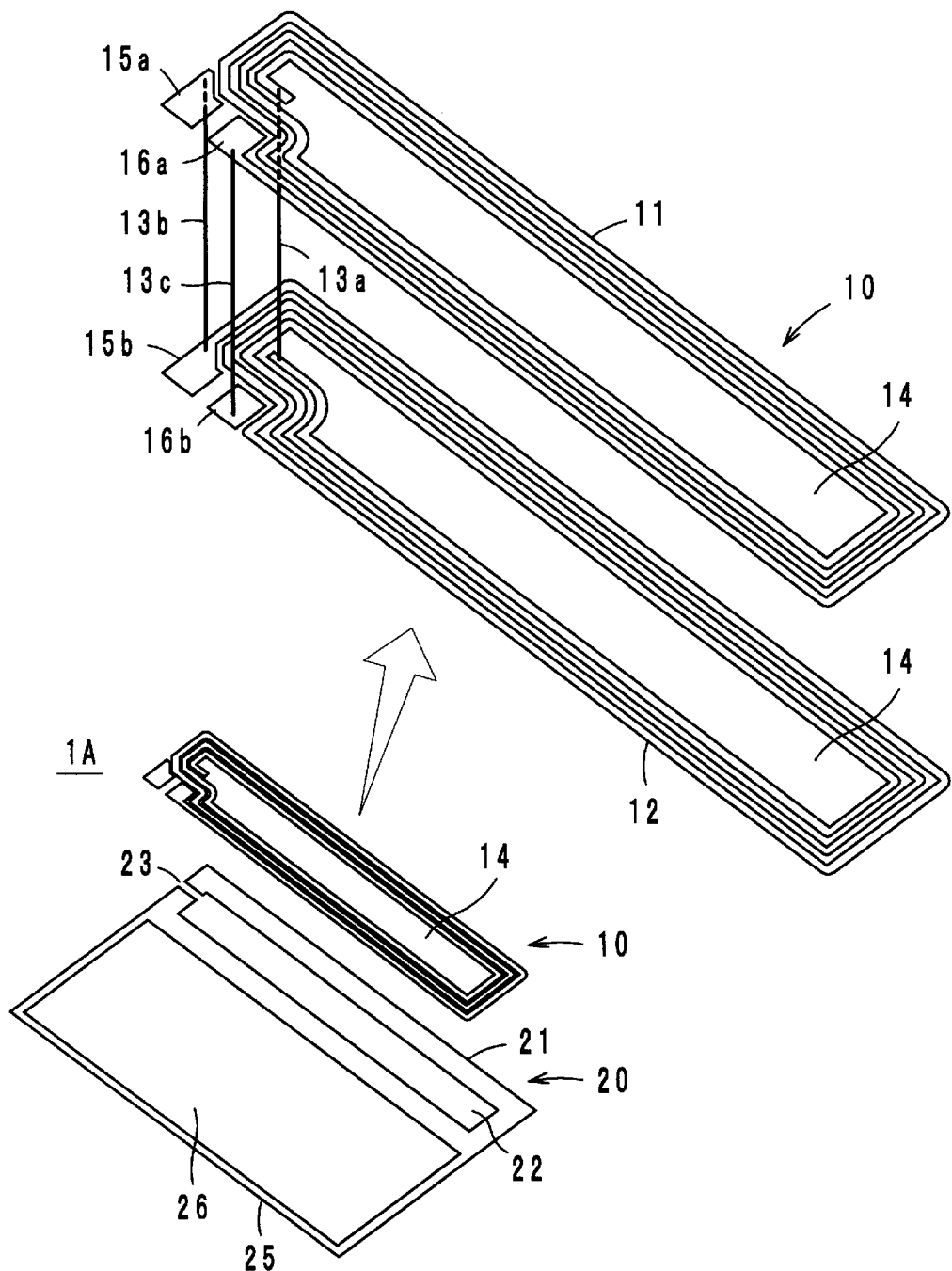
FIG. 1 is an exploded perspective view of an antenna device according to a first preferred embodiment of the present invention.

Referring to FIG. 1, an antenna device 1A according to a first preferred embodiment of the present invention includes a coil conductor 10 and a booster conductor 20. The coil conductor 10 preferably has a two-layer stacked structure including an insulating sheet, which is not illustrated in the figure, between the layers, for example. Loop-shaped conductors 11 and 12 that are wound so as to be superposed with each other in plan view are connected at ends thereof through a via hole conductor 13a, thereby forming a single coil including a first opening 14 at the center of the winding. Further, feeding terminals 15a and 15b are connected to each other through a via hole conductor 13b, and feeding terminals 16a and 16b are connected to each other through a via hole conductor 13c. The feeding terminal 15b is connected to one end of the loop-shaped conductor 12 and the feeding terminal 16a is connected to one end of the loop-shaped conductor 11. The feeding terminals 15a and 16a are connected to a feeding circuit, which is not illustrated. The feeding circuit, which is preferably a known circuit, for example, is defined by a semiconductor integrated circuit device that includes signal processing circuits, such as an RF circuit and a baseband (BB) circuit. Note that one of the feeding terminals 15a and 16a of the loop-shaped conductor 11 may be grounded so as to enable unbalanced feeding.

The booster conductor 20 preferably includes a coupling conductor portion 21 and a frame-shaped radiation conductor portion 25. The coupling conductor portion 21 includes a second opening 22 that is overlapped by the coil conductor 10 in plan view. The coupling conductor portion 21 is split in a portion thereof by a slit 23 and is electromagnetically coupled to the coil conductor 10. In other words, the first opening 14 overlaps the second opening 22 in plan view. The frame-shaped radiation conductor portion 25 includes a third opening 26 and is connected to the coupling conductor portion 21 at two points.

The coil conductor 10 and the booster conductor 20 are preferably made of, for example, a metal foil, metal thin film, or metal thick film in a predetermined shape on an insulating layer, which is not illustrated. A metal thin film may be formed by patterning using photolithography or etching, or a conductive paste may be printed using screen printing, for example.

Figure 2A:
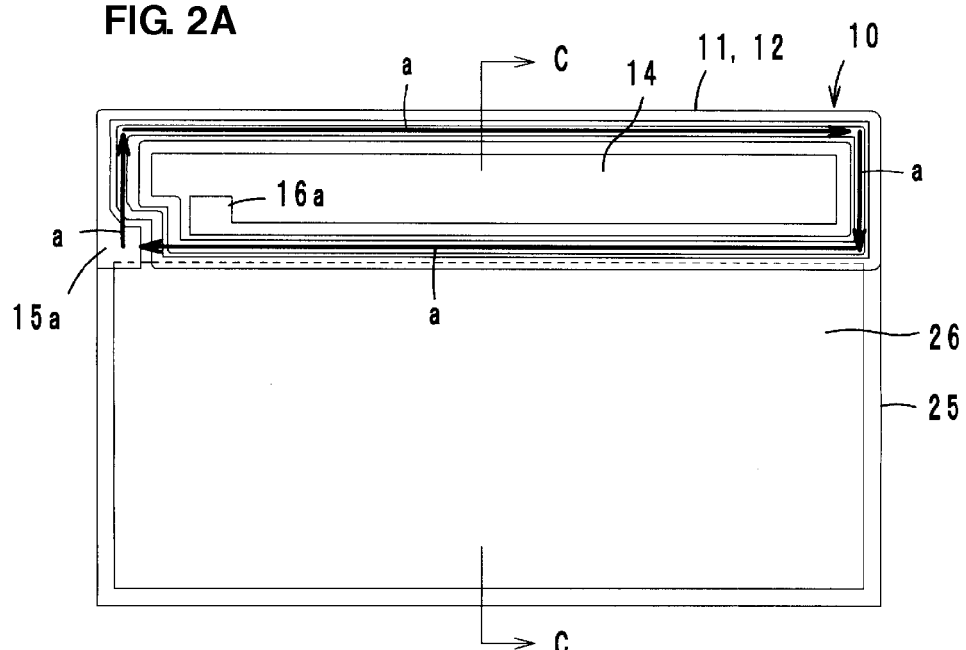
FIGS. 2A-2C illustrate an antenna device according to the first preferred embodiment of the present invention, where
Figure 2B:
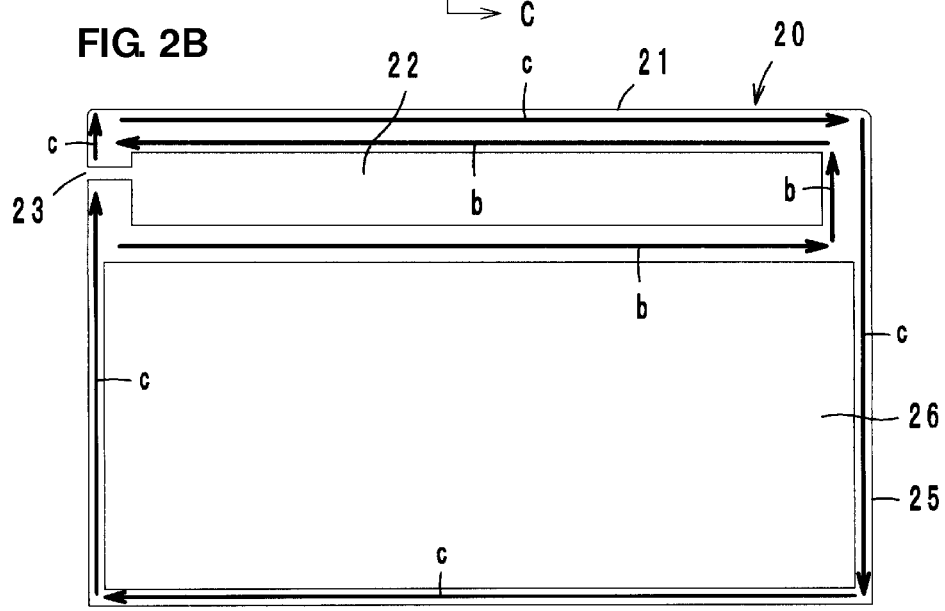

In the antenna device 1A, the coil conductor 10 is electromagnetically coupled to the coupling conductor portion 21, and a high frequency signal is transmitted/received between a feeding circuit and the booster conductor 20. In detail, as illustrated in FIGS. 2A and 2B, an induced current a flows circularly through the coil conductor 10 (loop-shaped conductors 11 and 12) connected to the feeding circuit, and the induced current a causes an induced current c to be generated in the frame-shaped radiation conductor portion 25 via an induced current b flowing through the coupling conductor portion 21. Note that the induced current c flows in a concentrated manner in the same direction in the inner peripheral end portion and outer peripheral end portion of the frame-shaped radiation conductor portion 25. Since the coupling conductor portion 21 includes the slit 23 provided therein, a potential difference is generated in the induced current b generated in the coupling conductor portion 21, and the coupling conductor portion 21 and the coil conductor 10 are coupled to each other. Further, a magnetic field is generated from the frame-shaped radiation conductor portion 25, and communication with the reader/writer of an RFID system is performed. A high-frequency signal radiated from the antenna of the reader/writer is transmitted to the feeding circuit in the opposite direction through the path described above. Note that the coil conductor 10 is illustrated as a single-layer conductor in FIG. 2 for simplicity.

Figure 3:
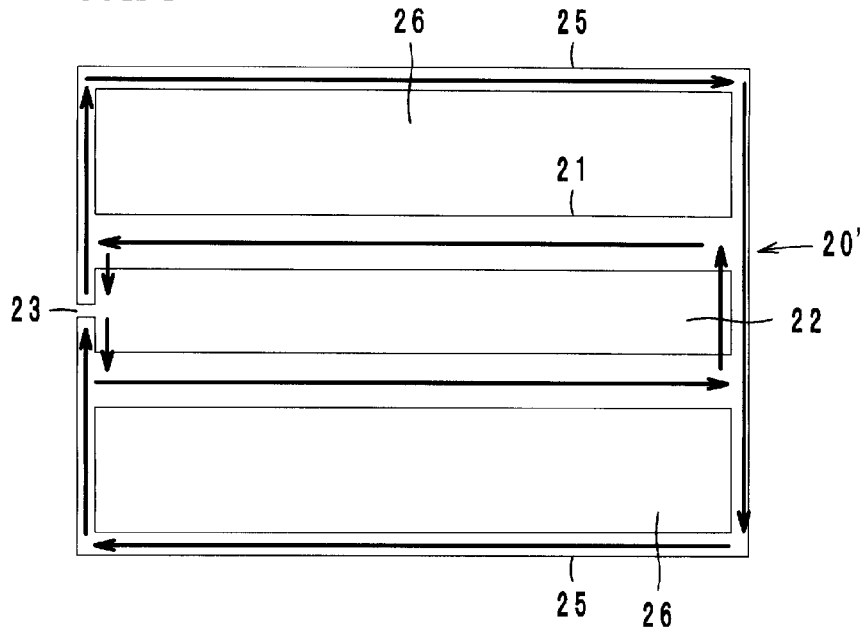
FIG. 3 is a diagram explaining currents flowing through a booster conductor of a comparative example.

Since the booster conductor 20 is overlapped in plan view by the coil conductor 10 in the coupling conductor portion 21, the induced currents a and b are efficiently generated, whereby communication characteristics are improved. In particular, since the radiation conductor portion 25 of the booster conductor 20 has a frame shape, a decrease in the Q factor due to the closeness of conductors is prevented and the communication characteristics are improved. In a booster conductor 20' illustrated in FIG. 3 as a comparative example, the frame-shaped radiation conductor portions 25 are disposed on both sides of the coupling conductor portion 21 so as to surround the entire periphery of the coil conductor 10. Also in this case, the booster conductor 20' is overlapped by the coil conductor 10 in the coupling conductor portion 21 in plan view. When the frame-shaped radiation conductor portion 25 surrounds the entire periphery of the coil conductor 10, the Q factor of the coil conductor 10 is decreased. However, since the frame-shaped radiation conductor portion 25 is arranged on only one side of the coil conductor 10 in the antenna device 1A, a decrease in the Q factor of the coil conductor 10 is relatively small.

Figure 2C:
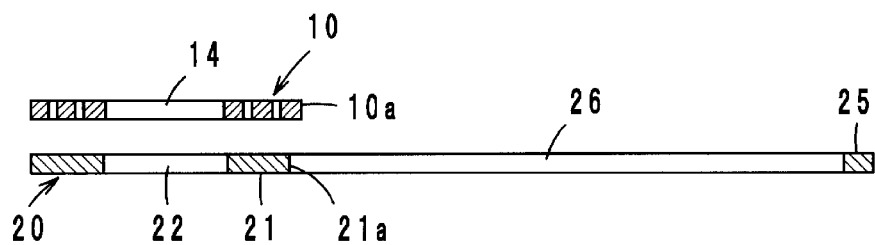

The manner in which the coil conductor 10 overlaps the coupling conductor portion 21 has a subtle influence on the electromagnetic coupling between the two conductors and the manner in which the induced current b is generated. The coil conductor 10 may completely overlap the coupling conductor portion 21 in plan view or a peripheral portion 10a of the coil conductor 10 may protrude toward the third opening 26 side beyond a peripheral portion 21a, as illustrated in FIG. 2C, for example.

Figure 4:
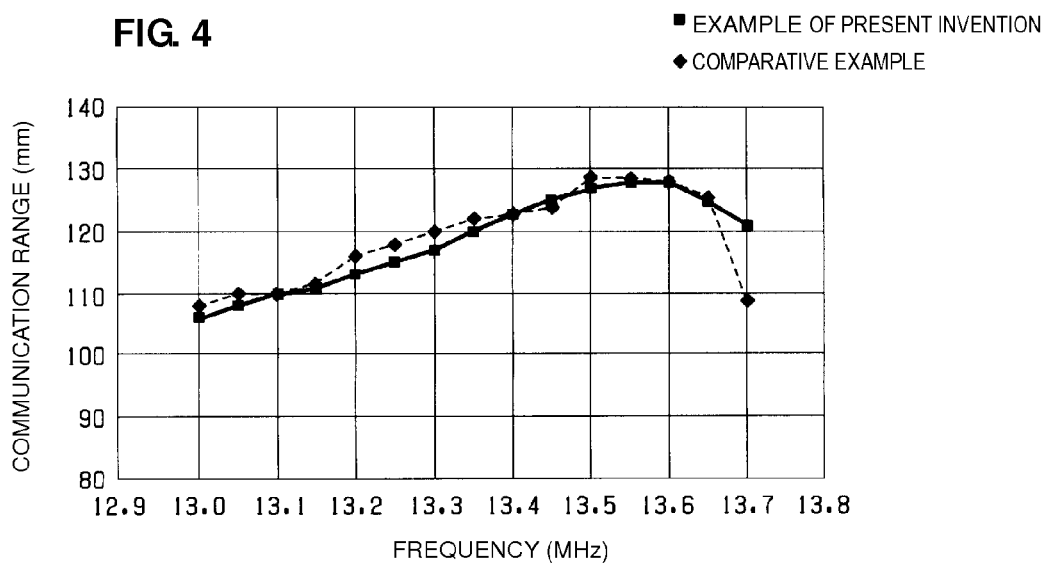
FIG. 4 is a graph illustrating the communication characteristics of an antenna device of the first preferred embodiment of the present invention and the comparative example.
Figure 5:
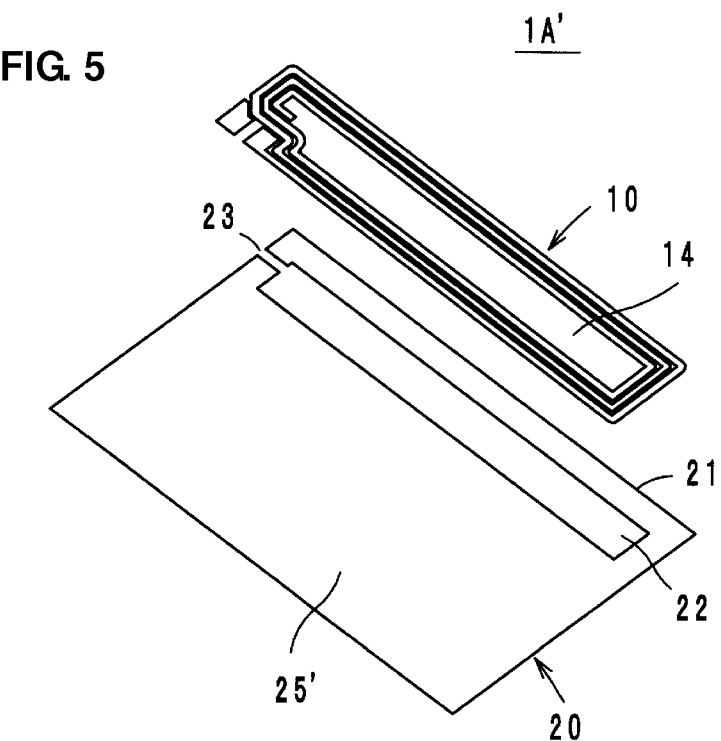
FIG. 5 is an exploded perspective view of an antenna device of another comparative example.

The communication characteristics of the antenna device 1A are illustrated in FIG. 4. As a comparative example, the communication characteristics of the antenna device 1A' illustrated in FIG. 5 are also illustrated in FIG. 4. The antenna device 1A', as a comparative example, has a configuration in which the booster conductor 20 has been replaced by a solid radiation conductor portion 25', that is, a configuration in which the third opening 26 is filled with a metal material. Usually, the solid radiation conductor portion 25' is configured to function as an antenna in this manner, and this configuration has favorable communication characteristics as illustrated by a dotted line in FIG. 4. On the other hand, the antenna device 1A according to the present preferred embodiment, although preferably configured as a frame-shaped radiation conductor portion 25, has communication characteristics that are substantially equivalent to those of the antenna device 1A'.

In the antenna device 1A, since the radiation conductor portion 25 preferably has a frame shaped (the third opening 26), information can be input/output through the third opening 26. Further, since almost no magnetic field is generated in the third opening 26, communication characteristics are not deteriorated even when a metal component is arranged within the third opening 26. This is an advantage which the comparative example (antenna device 1A') illustrated in FIG. 5 does not have.

In other words, it is possible to take a photograph through the third opening 26 by arranging a camera in the third opening 26, infrared communication with the outside is possible through the third opening 26 by arranging an infrared communication apparatus in the third opening 26, and audio messages, for example, can be transmitted to the outside through the third opening 26 by arranging a loud speaker in the third opening 26. In this manner, by arranging an electronic apparatus in the third opening 26 to output information to the outside or receive information from the outside, high-density component mounting in a portable terminal apparatus is achieved without significantly influencing the operation of the electronic apparatus.

Figure 6:
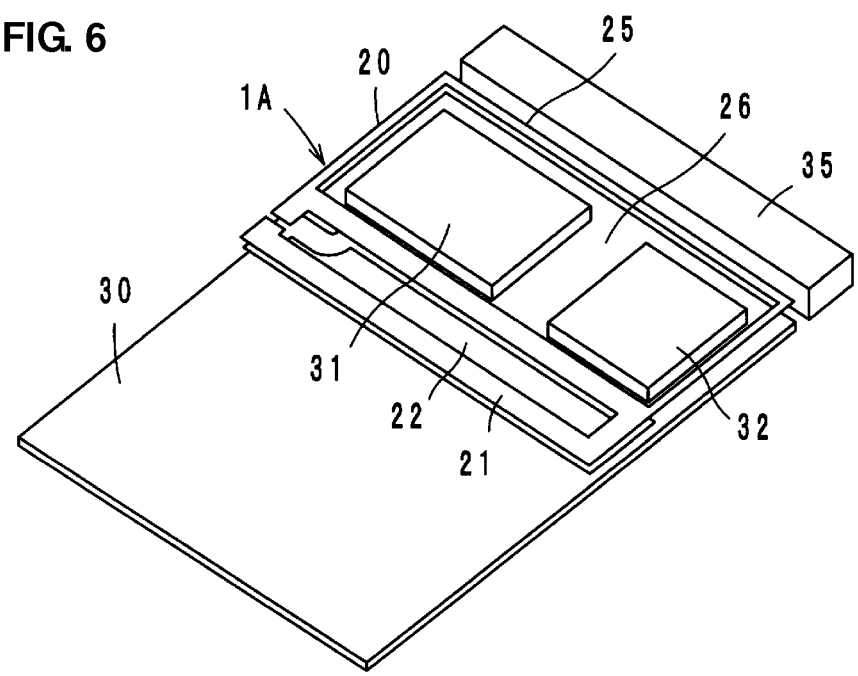
FIG. 6 is a perspective view of the major portions of a portable terminal apparatus into which the antenna device of the first preferred embodiment of the present invention has been incorporated.

FIG. 6 illustrates the major portions of a portable terminal apparatus into which the antenna device 1A is incorporated. The antenna device 1A is preferably mounted on a substrate 30 of a portable terminal apparatus with the booster conductor 20 being arranged on the upper side, electronic apparatuses 31 and 32, such as a camera, an infrared communication apparatus, and a loud speaker, for example, are preferably arranged within the region of the third opening 26.

Another antenna device 35 is arranged next to the radiation conductor portion 25. The antenna device 35 is the main antenna of the portable terminal apparatus. When the antenna device 35 is arranged close to the solid radiation conductor portion 25' illustrated in FIG. 5, the communication characteristics of the antenna device 35 are deteriorated. However, in the antenna device 1A of the present preferred embodiment, since the radiation conductor portion 25 has a small conductor area, interference with the antenna device 35 is small and, thus, the communication characteristics of the antenna device 35 are not deteriorated even when the antenna device 35 is arranged next to the radiation conductor portion 25.

By using the antenna device 1A, since the electronic apparatuses 31 and 32 can be arranged in the third opening 26 and the antenna device 35 can be arranged close to the antenna device 1A, the component mounting density in the portable terminal apparatus is greatly increased. Further, when these electronic apparatuses include a member made of a magnetic material, such as ferrite, or a metallic magnetic material, such as Fe, Ni, or MgO, for example, the communication range can be further increased because the magnetic flux density in the third opening 26 is increased.

Modification of Antenna Device

Figure 7:
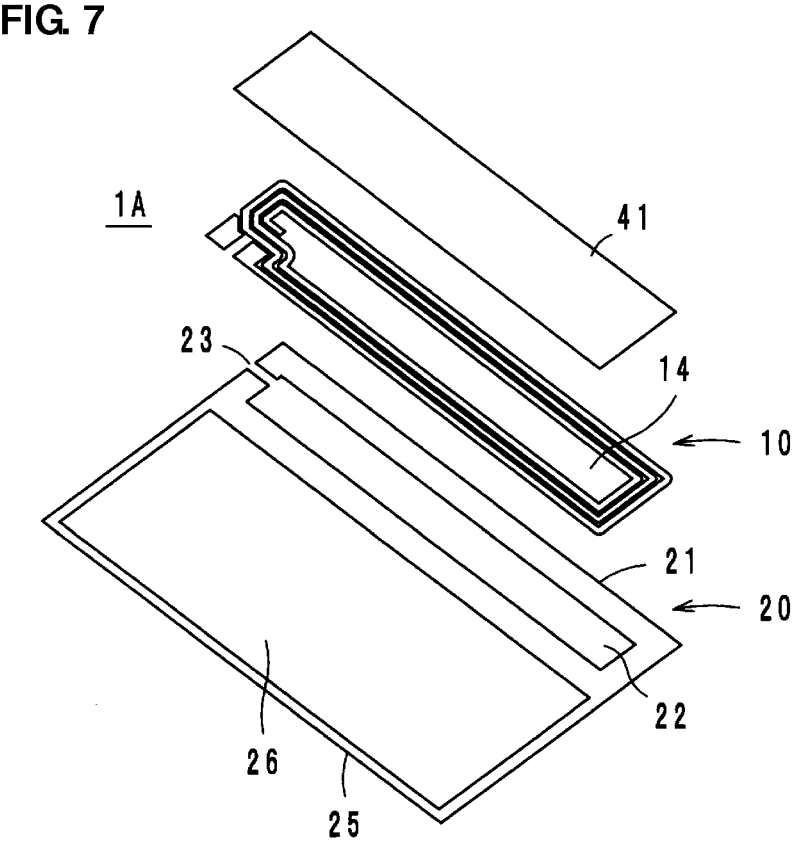
FIG. 7 is an exploded perspective view of a modified example of an antenna device of the first preferred embodiment of the present invention.

Referring to FIG. 7, a magnetic sheet 41 (preferably, ferrite sheet) may preferably be pasted to the coil conductor 10 side of the antenna device 1A. By using the magnetic sheet 41, a magnetic field generated in the coupling conductor portion 21 is prevented from leaking to the coil conductor 10 side, whereby the strength of a magnetic field radiated from the frame-shaped radiation conductor portion 25 is increased and, thus, the communication characteristics are further improved.

Modification of Coil Conductor

Figure 8:
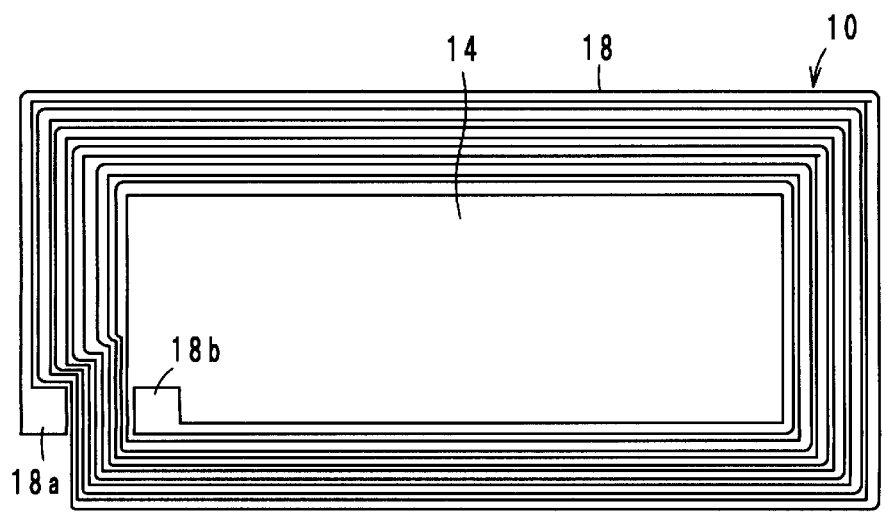
FIG. 8 is a plan view illustrating a modified example of a coil conductor.

Referring to FIG. 8, the coil conductor 10 may preferably include only a single-layer loop-shaped conductor 18. In this case, the two end portions of the loop-shaped conductor 18 define feeding terminals 18a and 18b, and are connected to a feeding circuit. Note that the number of turns of the loop-shaped conductor 18 may be any suitable number.

Second Preferred Embodiment

Figure 9A:
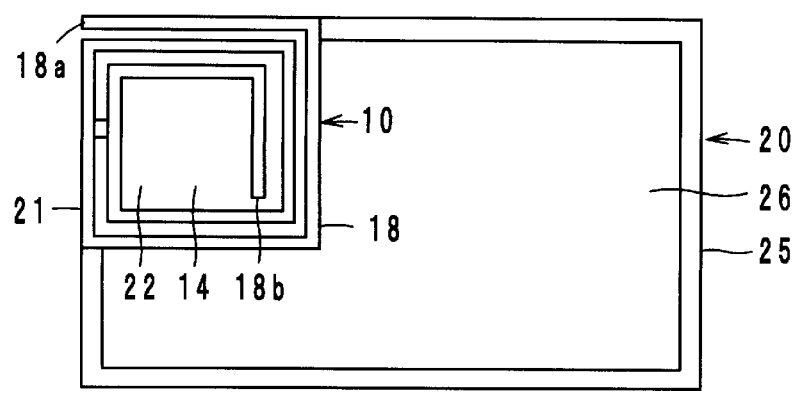
FIGS. 9A and 9B illustrate an antenna device according to a second preferred embodiment of the present invention, where
Figure 9B:
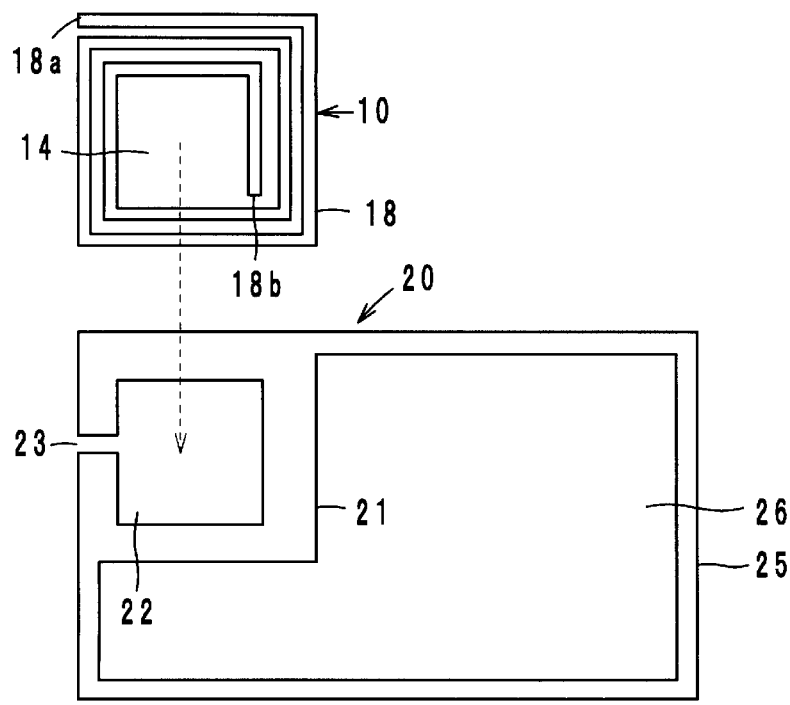

Referring to FIGS. 9A and 9B, an antenna device 1B according to a second preferred embodiment of the present invention preferably includes a frame-shaped radiation conductor portion 25 that is connected to two points located on a diagonal line of a square-shaped coupling conductor portion 21. A coil conductor 10 is overlaid on the coupling conductor portion 21 as a single-layer loop-shaped conductor 18 that is preferably wound in a square shape, for example. The two ends of the loop-shaped conductor 18 define feeding terminals 18a and 18b. The antenna device 1B has the same or substantially the same operations and advantages as the antenna device 1A.

Third Preferred Embodiment

Figure 10A:
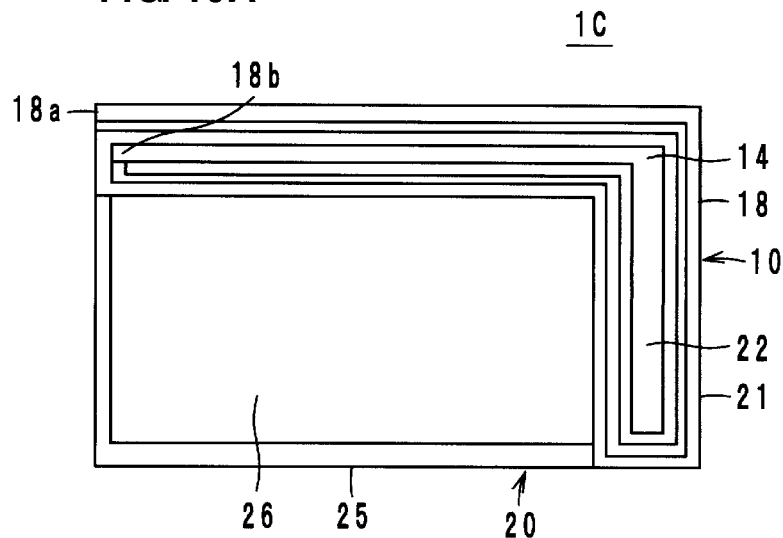
FIGS. 10A and 10B illustrate an antenna device according to a third preferred embodiment of the present invention, where
Figure 10B:
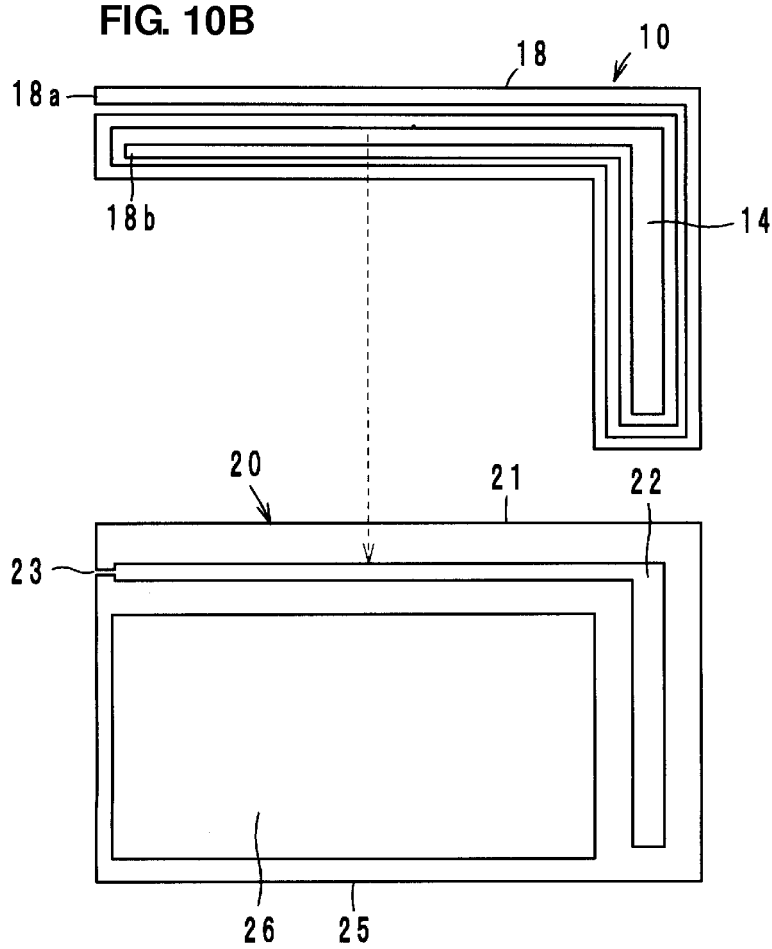

Referring to FIGS. 10A and 10B, an antenna device 1C according to a third preferred embodiment of the present invention preferably includes a coil conductor 10 and a coupling conductor portion 21 that are substantially L-shaped, for example, and are superposed with each other. The coil conductor 10 is defined by a single-layer loop-shaped conductor 18, and the two ends of the loop-shaped conductor 18 define feeding terminals 18a and 18b. The antenna device 1C also has the same or substantially the same operations and advantages as the antenna device 1A.

Fourth Preferred Embodiment

Figure 11A:
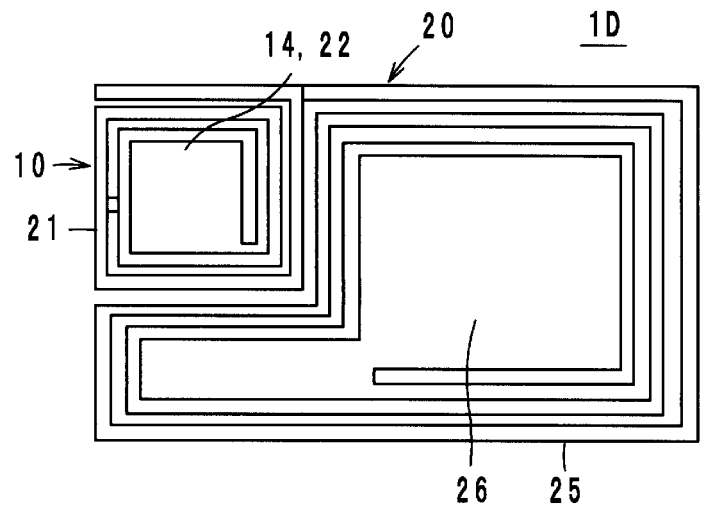
FIGS. 11A and 11B illustrate an antenna device according to a fourth preferred embodiment of the present invention, where
Figure 11B:
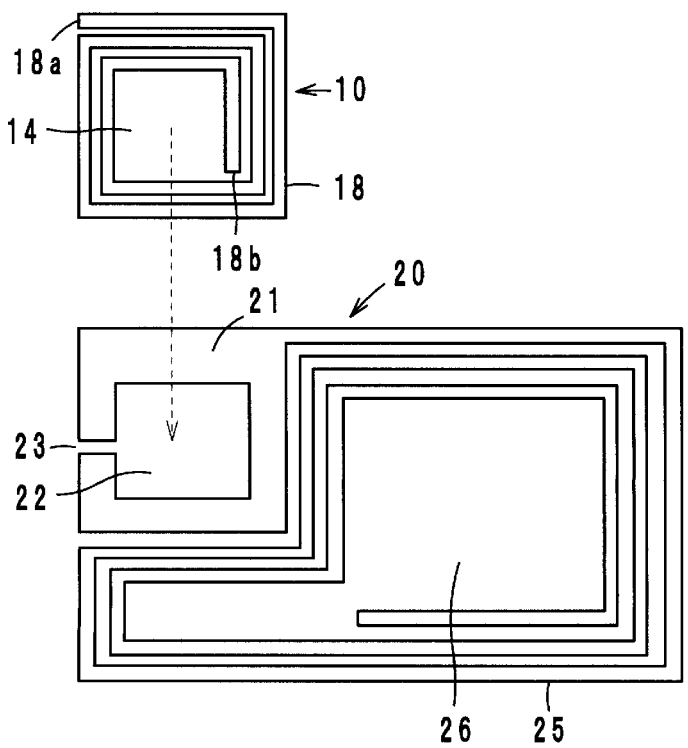

Referring to FIGS. 11A and 11B, an antenna device 1D according to a fourth preferred embodiment of the present invention preferably includes a frame-shaped radiation conductor portion 25 that is configured in the shape of a coil. Other configurations are the same or substantially the same as the antenna devices 1A and 1B. The antenna device 1D also has the same or substantially the same operations and advantages as the antenna device 1A. In particular, in the antenna device 1D, the resonance frequency of the frame-shaped radiation conductor portion 25 can be set to be close to 13.56 MHz, which is the best frequency for use in an RFID system, by adjusting the shape of the coil conductor 10 and the electrical length and the inter-line capacitance of the frame-shaped radiation conductor portion 25.

Fifth Preferred Embodiment

Figure 12:
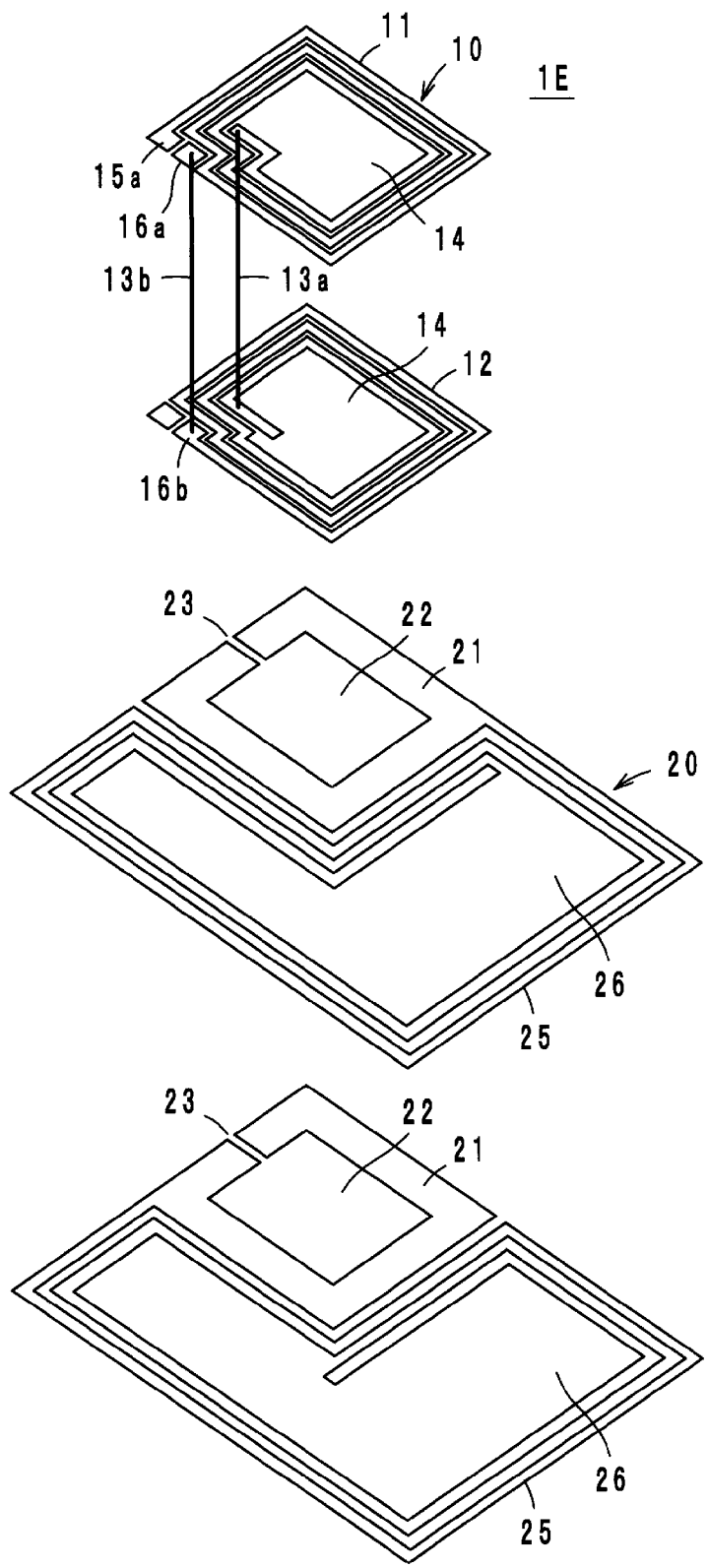
FIG. 12 is an exploded perspective view of an antenna device according to a fifth preferred embodiment of the present invention.

Referring to FIG. 12, an antenna device 1E according to a fifth preferred embodiment of the present invention preferably includes a coil conductor 10 and a booster conductor 20 which both have a two-layer stacked structure, and is preferably formed by evaporating aluminum onto the top and bottom surfaces of an insulating sheet, which is not illustrated, such as a PET film, for example.

The coil conductor 10 includes loop-shaped conductors 11 and 12 that are wound so as to be superimposed with each other in plan view and connected to each other at the ends thereof by a via hole conductor 13a, thereby forming a single coil, and first openings 14 are provided at the winding centers. An end of the loop-shaped conductor 11 is connected to a feeding terminal 15a, and a feeding terminal 16b connected to an end of the loop-shaped conductor 12 is connected to a feeding terminal 16a through a via hole conductor 13b. The feeding terminals 15a and 16a are connected to a feeding circuit, which is not illustrated.

The booster conductor 20 preferably includes a second opening 22, a coupling conductor portion 21 including a slit 23, and a frame-shaped radiation conductor portion 25 that is configured in the shape of a coil and includes a third opening 26. The frame-shaped radiation conductor portions 25 including two layers are not electrically connected to each other, and are electromagnetically coupled to each other. The coil conductor 10 and the coupling conductor portion 21 (the first opening 14 and the second opening 22) are arranged so as to be superposed with each other in plan view.

The antenna device 1E has the same or substantially the same operations and advantages as the antenna device 1A. Further, since each of the coil conductor 10 and the booster conductor 20 has a two-layer stacked structure, coupling between the two is increased, whereby communication characteristics are further improved.

Note that communication terminal apparatuses and antenna devices according to preferred embodiments of the present invention are not limited to the above-described preferred embodiments, and various modifications are possible within the scope of the invention.

For example, instead of a feeding circuit, a wireless IC chip that processes a predetermined high-frequency signal may be connected to the feeding terminals of a coil conductor. The antenna device may be mounted on various communication terminal apparatuses, such as an IC card, other than a cellular phone, for example.

As described above, preferred embodiments of the present invention are useful in communication terminal apparatuses and antenna devices. In particular, preferred embodiments of the present invention are advantageous in that communication characteristics are improved and other electronic apparatuses can be arranged with high space efficiency.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A communication terminal apparatus comprising:
   an antenna device; and
   an electronic apparatus having a different function from a function of the antenna device and that outputs information to the outside or receives information from the outside;
   wherein
   the antenna device comprises:
      a coil conductor defined by a wound loop-shaped conductor and including a first opening at a winding center and two ends which are connected to a feeding circuit; and
      a booster conductor including:
         a coupling conductor portion that includes a second opening overlapped at least partially by the first opening, is split in a portion thereof by a slit, and is electromagnetically coupled to the coil conductor; and
         a frame-shaped radiation conductor portion that includes a third opening and is connected to the coupling conductor portion;
   the electronic apparatus is arranged so as to output information to the outside or receive information from the outside through the third opening; and
   at least a portion of an outer edge of the coil conductor overlaps with an outer edge of the coupling conductor portion.

2. The communication terminal apparatus according to claim 1, wherein another antenna device is arranged so as to be adjacent to the frame-shaped radiation conductor portion.

3. The communication terminal apparatus according to claim 1, wherein the electronic apparatus is arranged within the third opening in plan view.

4. The communication terminal apparatus according to claim 1, wherein a magnetic sheet is arranged on the coil conductor side.

5. An antenna device comprising:
- a coil conductor defined by a wound loop-shaped conductor and including a first opening at a winding center and two ends which are connected to a feeding circuit; and
- a booster conductor including:
  - a coupling conductor portion that includes a second opening overlapped at least partially by the first opening, is split in a portion thereof by a slit, and is electromagnetically coupled to the coil conductor; and
  - a frame-shaped radiation conductor portion that includes a third opening and is connected to the coupling conductor portion; wherein
- at least a portion of an outer edge of the coil conductor overlaps with an outer edge of the coupling conductor portion.

6. The antenna device according to claim 5, wherein the coupling conductor portion is not arranged at a center of the frame-shaped radiation conductor portion.

7. The antenna device according to claim 5, wherein the frame-shaped radiation conductor portion is connected to the coupling conductor portion at two points.

8. The antenna device according to claim 5, wherein the coil conductor includes a plurality of layers and insulators disposed between the plurality of layers.

9. The antenna device according to claim 5, wherein the booster conductor includes a plurality of layers and insulators disposed between the plurality of layers.

10. The antenna device according to claim 5, wherein a magnetic sheet is arranged on a coil conductor side of the antenna device.

* * * * *